United States Patent
Millner et al.

(10) Patent No.: US 9,377,242 B2
(45) Date of Patent: Jun. 28, 2016

(54) METHOD FOR TREATING WASTE GASES FROM PLANTS FOR PIG IRON PRODUCTION

(75) Inventors: Robert Millner, Loosdorf (AT); Gerald Rosenfellner, Ertl (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 153 days.

(21) Appl. No.: 14/240,430

(22) PCT Filed: Aug. 22, 2012

(86) PCT No.: PCT/EP2012/066319
§ 371 (c)(1),
(2), (4) Date: Feb. 24, 2014

(87) PCT Pub. No.: WO2013/030057
PCT Pub. Date: Mar. 7, 2013

(65) Prior Publication Data
US 2014/0202285 A1    Jul. 24, 2014

(30) Foreign Application Priority Data
Aug. 31, 2011  (AT) ................. A 1245/2011

(51) Int. Cl.
| | |
|---|---|
| C21B 13/14 | (2006.01) |
| C01B 3/12 | (2006.01) |
| F27D 17/00 | (2006.01) |
| C21B 13/00 | (2006.01) |

(52) U.S. Cl.
CPC ............... *F27D 17/004* (2013.01); *C01B 3/12* (2013.01); *C21B 13/002* (2013.01); *C21B 13/143* (2013.01); *C01B 2203/0283* (2013.01); *C01B 2203/043* (2013.01); *C01B 2203/0475* (2013.01); *C01B 2203/145* (2013.01); *C21B 2100/02* (2013.01); *C21B 2100/04* (2013.01); *Y02P 10/122* (2015.11); *Y02P 10/126* (2015.11); *Y02P 10/128* (2015.11); *Y02P 10/132* (2015.11); *Y02P 10/136* (2015.11); *Y02P 10/216* (2015.11); *Y02P 10/265* (2015.11); *Y02P 10/283* (2015.11); *Y02P 20/129* (2015.11); *Y02P 20/13* (2015.11); *Y02P 30/30* (2015.11)

(58) Field of Classification Search
CPC .............. C01B 3/12; C01B 2203/0283; C01B 2203/0475; C21B 13/002; C21B 13/143; C21B 2100/02; C21B 2100/04; F27D 17/004
See application file for complete search history.

(56) References Cited

U.S. PATENT DOCUMENTS

| | | | |
|---|---|---|---|
| 5,676,732 A | 10/1997 | Viramontes-Brown et al. | |
| 8,821,760 B2 * | 9/2014 | Millner ................... | C01B 3/12 252/373 |

FOREIGN PATENT DOCUMENTS

| | | |
|---|---|---|
| AT | 507 713 B1 | 10/2010 |
| CN | 101676368 | 3/2010 |

(Continued)

OTHER PUBLICATIONS

Millner, R. Derwent Acc No. 2010-F92016 for the patent family including WO 2010057767 A1 published May 27, 2010.*
International Search Report dated Jan. 30, 2013 issued in corresponding International patent application No. PCT/EP2012/066319.
International Preliminary Report on Patentability dated Nov. 28, 2013 issued in corresponding International patent application No. PCT/EP2012/066319.

*Primary Examiner* — George Wyszomierski
*Assistant Examiner* — Tima M McGuthry Banks
(74) *Attorney, Agent, or Firm* — Ostrolenk Faber LLP (57) ABSTRACT

A method and a system for treating waste gases (4) from plants (32, 33) for pig iron production, wherein a first sub-stream (51) of the waste gas is subjected to an at least partial conversion of CO into $CO_2$ after the addition of water and/or water vapor (10) and the waste gas (4) is then subjected to $CO_2$ capture. To be able to set a variable $H_2/CO$ ratio in the waste gas, a further sub-stream (52) of the waste gas is not subjected to a conversion of CO into $CO_2$, but is subjected to $CO_2$ capture separately from the first sub-stream (51).

9 Claims, 2 Drawing Sheets

(56) References Cited

FOREIGN PATENT DOCUMENTS

| EP | 0 934 904 A2 | 8/1999 |
| EP | 1 146 009 A1 | 10/2001 |
| WO | WO 2004/083343 A1 | 9/2004 |
| WO | WO 2009/008123 A2 | 1/2009 |
| WO | WO 2010/057767 A1 | 5/2010 |

* cited by examiner

METHOD FOR TREATING WASTE GASES FROM PLANTS FOR PIG IRON PRODUCTION

CROSS-REFERENCE TO RELATED APPLICATIONS

The present application is a 35 U.S.C. §§371 national phase conversion of PCT/EP2012/066319, filed Aug. 22, 2012, which claims priority of Austrian Application No. A1245/2011, filed Aug. 31, 2011, the contents of which are incorporated by reference herein. The PCT International Application was published in the German language.

FIELD OF THE INVENTION

The invention relates to a method and a device for treating waste gases from plants for pig iron production, wherein a first sub-stream of the waste gas is subjected to an at least partial conversion of CO into $CO_2$ after the addition of water and/or water vapor and the waste gas is then subjected to $CO_2$ capture.

PRIOR ART

There are essentially two known common methods used for the production of pig iron, which also includes the production of pig iron-like products: the blast furnace method and the smelting-reduction method.

In the blast furnace method, firstly pig iron is made from iron ore with the aid of coke. In addition, scrap can also be utilized. Steel is then made from the pig iron in further processes. The iron ore is mixed as lump ore, pellets or sinter with the reducing agents (mostly coke or coal, e.g. in the form of a fine coal infeed system) and other constituents (limestone, slag flux, etc.) to form the "charge" and is then fed into the blast furnace. The blast furnace is a metallurgical reactor in which the charge column reacts in contraflow with hot air, the "hot blast". Combustion of the carbon from the coke produces the heat and carbon monoxide and/or hydrogen which are needed for the reaction and represent a substantial proportion of the reducing gas which flows through the charge column and reduces the iron ore. The result is the production of pig iron and slag, which are periodically tapped off.

In the "oxygen blast furnace" which is also designated a blast furnace with top gas recycling, during the gasification of coke or coal, oxygen-containing gas with an oxygen (Od content of more than 90% by volume is blown into the furnace.

A gas cleaning apparatus (e.g. dust separator and/or cyclone in combination with wet washers, bag filter units or hot gas filters) must be provided for the gas emerging from the blast furnace, known as top gas. Furthermore, in an oxygen blast furnace, a compressor, preferably with an aftercooler, is usually provided for the top gas returned to the blast furnace and a device is provided for $CO_2$ removal which, according to the prior art, is usually achieved by "pressure swing adsorption".

Further options for the design of an oxygen blast furnace method are a heater for the reducing gas and/or a combustion chamber for partial combustion with oxygen.

The disadvantages of the blast furnace are the requirements placed on the input materials and the high output of carbon dioxide. The iron-bearing material and the coke used must consist of lumps and be hard so that sufficient hollow spaces remain in the charge column, ensuring the throughflow of the blown-in air. The $CO_2$ output represents a serious environmental burden. Efforts are therefore being made to replace the blast furnace method. Worth mentioning in this context are sponge iron production based on natural gas (MIDREX, HYL, FINMET®) and the smelting-reduction methods (COREX® and FINEX® methods).

In the case of smelting-reduction, a melter gasifier is used in which hot liquid metal is produced, and at least one reducing reactor in which the carrier of the iron ore (lump ore, fine ore, pellets, sinter) is reduced with reducing gas which is generated in the melter gasifier by the gasification of coal (and possibly also a small content of coke) with oxygen (90% or more).

Also typically provided in the smelting-reduction method are gas cleaning systems (both for the top gas from the reducing reactor and for the reducing gas from the melter gasifier), a compressor, preferably with an aftercooler, for the reducing gas recycled in the reducing reactor, a device for $CO_2$ removal which is usually achieved, according to the prior art, by pressure swing adsorption, and optionally a heater for the reducing gas and/or a combustion chamber for partial combustion with oxygen.

The COREX® process is a two-stage smelting-reduction process. Smelting-reduction combines the process of indirect reduction (pre-reduction of iron to sponge iron, often also called "direct reduction") with a smelting process (main reduction).

The known FINEX® method essentially corresponds to the COREX® method, although iron ore is introduced as fine ore and is pre-reduced in a plurality of fluidized reactors arranged in sequence.

Pressure swing adsorption (PSA) is preferably used for the removal of $CO_2$ from the waste gases from pig iron production, particularly also vacuum pressure swing adsorption (VPSA). Pressure swing adsorption is a physical process for selectively separating gas mixtures under pressure. It belongs to the prior art and therefore need not be explained further. Naturally, other chemical or physical processes can also be used for $CO_2$ removal in the present invention.

The product gas stream from the $CO_2$ removal which contains the useful substances, can be fed back to the pig iron production. Following the pressure swing adsorption of waste gases from pig iron production, the gas stream still contains approximately 2%-6% by volume of $CO_2$ and typically has the following composition:

| Compound | vol % with PSA |
|---|---|
| $H_2$ | 42 |
| $N_2$ | 10 |
| CO | 45 |
| $CO_2$ | 1 |
| $CH_4$ | 2 |
| $H_2O$ | 0 |

The residual gas ("tail gas") stream from the $CO_2$ removal still contains relatively highly reducing gas components (such as CO, $H_2$), which can also be re-used for pig iron production and, in the case of waste gases from pig iron production, is typically composed following a (V)PSA system as follows:

| Compound | vol % with VPSA | vol % with PSA |
|---|---|---|
| $H_2$ | 2.2 | 5.5 |
| $N_2$ | 1.5 | 2.4 |

-continued

| Compound | vol % with VPSA | vol % with PSA |
|---|---|---|
| CO | 10.9 | 16.8 |
| $CO_2$ | 82.1 | 72.2 |
| $CO_4$ | 0.7 | 0.9 |
| $H_2O$ | 2.6 | 2.2 |

The tail gas often cannot simply be utilized thermally, since due to the calorific value (which is low and/or varies) of approximately ±50%—the gas would have to be enriched with other fuels. The gas may be mixed in its entirety with the "export gas", that is the part of the process gas which is extracted from the process of pig iron production and is used for other purposes, for example, as a fuel in a combined gas and steam power plant, also known as a "combined cycle power plant", CCPP). The following can be constituents of the export gas:

Top gas from a blast furnace or a reducing reactor configured as a fluidized reactor or as a reduction shaft (packed bed reactor)

"off-gas" from a reducing reactor (fluidized reactor)

"excess gas" from a melter gasifier.

In order to increase the hydrogen content in the waste gas stream from pig iron production or in the product gas stream following $CO_2$ removal in relation to the carbon monoxide (CO) content and thus to enable the utilization of the waste gas or product gas therefrom as reducing gas, in U.S. Pat. No. 5,676,732 A and in WO 2009/082123 A2, it is proposed that, in addition to the $CO_2$ removal, CO conversion by means of a water gas shift reactor (WGSR) should be carried out. In the water gas shift reaction, CO is converted, by the addition of water (vapor), to free hydrogen $H_2$ and $CO_2$. This is an exothermic reaction and represents a method for reducing the CO content in the gas and for generating hydrogen. The reaction can be accelerated with the aid of catalysts.

U.S. Pat. No. 5,676,732 A discloses subjecting the entire export gas from a reduction shaft, for example a COREX® system, to conversion of the CO into carbon dioxide $CO_2$. This has the disadvantage that large quantities of steam are required due to the necessary steam excess of approximately 300 t/h in the case of a COREX® system. The large hydrogen content leads to a limitation of the pig iron production and also necessitates high reducing gas temperatures.

WO 2009/082123 A2 discloses that only part of the waste gas from the reducing reactors is subjected to conversion of CO into $CO_2$, specifically the portion that is fed back into the reducing gas following the melter gasifier 10, whilst another portion of the waste gas is drawn out of the reducing reactors without conversion of CO into carbon dioxide $CO_2$ as export gas from the pig iron production.

AT 507 713 B1 discloses that where the waste gas from smelting-reduction plants (COREX®, FINEX®) and oxygen blast furnaces is treated, only part of the waste gas from the reducing reactors is subjected to the conversion of CO into $CO_2$, specifically the portion that is fed back into the oxygen blast furnaces or into the reducing gas following the melter gasifier as reducing gas.

For other uses of the waste gas from the reducing reactors, for example, for a direct reduction plant, a waste gas with a higher carbon content would be needed, although with the methods according to WO 2009/082123 A2 and AT 507 713 B1, at a particular time point, only a waste gas with a specific $H_2$/CO ratio can be produced.

It is therefore an object of the invention to provide a method with which the waste gas from plants for pig iron production can be made available at a particular time point at a different $H_2$/CO ratio.

SUMMARY OF THE INVENTION

This object is achieved by a method of the invention, wherein apart from the first sub-stream of the waste gas which, following the addition of water and/or water vapor, is subjected to an at least partial conversion of CO into $CO_2$ and subsequently to $CO_2$ capture, a further sub-stream of the waste gas is not subjected to a conversion of CO into carbon dioxide $CO_2$, but is subjected to $CO_2$ capture separately from the first sub-stream.

Figure 4:
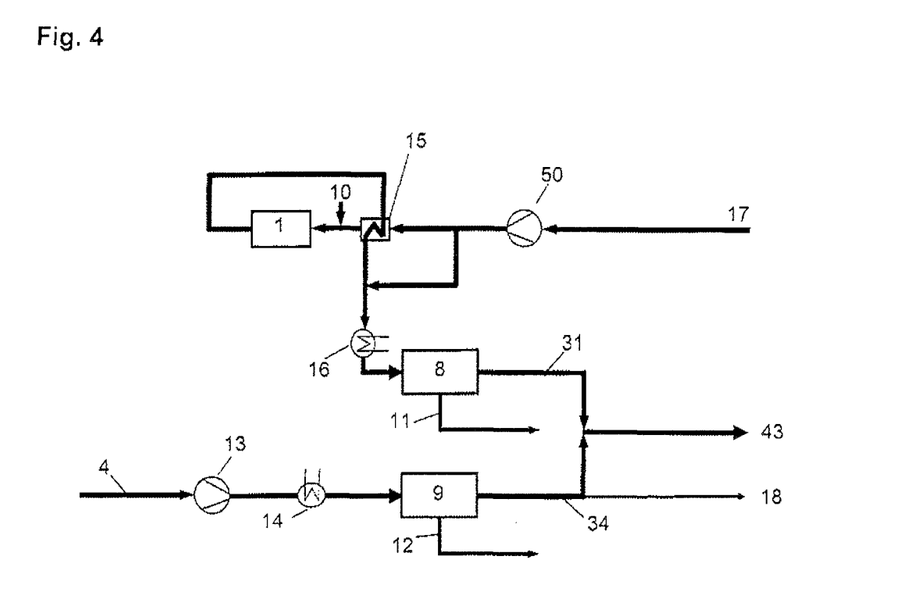
FIG. 4 is a diagram of a second embodiment according to the invention of a conversion reactor with two $CO_2$ capture systems.

The first and second sub-streams can either come from the same source and therefore have the same composition (see e.g. FIG. 1) or can come from different sources and therefore, typically, have different compositions (see e.g. FIG. 4). Both the first and the second sub-streams can contain only waste gas from plants for pig iron production.

The product gases following the respective $CO_2$ capture in the first and second sub-streams are mixed with one another to set a particular ratio of hydrogen to CO, in that part of the product gas following the $CO_2$ capture in the second sub-stream is mixed with the product gas following the $CO_2$ capture in the first sub-stream and the product gas is subsequently fed as the reducing gas into the reduction shaft of the direct reduction plant.

The waste gas of the first sub-stream following the conversion of CO into $CO_2$ is more hydrogen-rich than that of the second sub-stream which has not been subjected to any conversion of CO into $CO_2$. Consequently, the product gas following the $CO_2$ capture of the first sub-stream is more hydrogen-rich than that after the $CO_2$ capture of the second sub-stream. The product gas from the second sub-stream is therefore—apart from use thereof for reduction in a blast furnace process or a smelting-reduction process—also used for carburization and regulation of the carbon content in the product (DRI—direct reduced iron, HBI—hot briquetted iron, LRI—low reduced iron) from the direct reduction plant. For this purpose, the product gas is introduced into the cooling gas circuit or above the cooling zone, preferably into the "transition zone" between the reduction zone and the cooling zone of the reducing reactor, that is, for example, the reduction shaft of the direct reduction plant.

On the other hand, the residual gas or tail gas can barely be combusted alone following the $CO_2$ capture in the first sub-stream and without additional pre-heating, due to the low calorific value. Said tail gas is therefore best added to the remaining export gas. The residual gas or tail gas following the $CO_2$ capture in the second sub-stream can be used, due to the higher calorific value thereof as compared with the tail gas from the first sub-stream, for combustion, for example, in the reducing gas furnace of a direct reduction plant.

It can also be provided that the tail gas following the $CO_2$ capture in the first sub-stream and the tail gas following the $CO_2$ capture in the second sub-stream are mixed with one another, for example, to set the calorific value of the tail gas, e.g. for thermal exploitation.

The waste gas from a plant for pig iron production that is made use of in the context of this invention is the waste gas from a blast furnace, in particular an oxygen blast furnace, a smelting-reduction plant, for example, a COREX® or FINEX® plant or from a direct reduction plant, in particular a combined direct reduction plant consisting of a COREX® plant and a direct reduction plant.

Consequently, the waste gas comprises at least one of the following gases:
- top gas from a blast furnace, in particular from an oxygen blast furnace with top gas recycling or from a reduction shaft of a smelting-reduction plant,
- waste gas from a melter gasifier of a smelting-reduction plant which is also known as "excess gas",
- waste gas from at least one fluidized reactor which is also known as "off-gas"
- waste gas from at least one packed bed reactor for preheating and/or reducing iron oxide and/or iron briquettes of a smelting-reduction plant, which is also known as "top gas",
- waste gas from a $CO_2$ capture system associated with the plant for pig iron production,
- waste gas from at least one reducing reactor of a direct reduction plant.

In a direct reduction plant, iron ore-bearing substances in lump form (lump ore, fine ore or pellets (fine-grained iron ore is rolled into green pellets with water, binding agents and additives and hardened in a subsequent firing process)) are reduced in the solid state at 750° C. to 1000° C. by means of reducing gas or coal. Directly reduced iron (DRI) is the result, also known as "sponge iron".

The direct reduction plant contains, as the core thereof, a reducing reactor which is either configured as a reduction shaft in the context of a packed bed reactor or in the form of fluidized reactors into which the iron ore in lump form and the reducing gas (or the coal) are introduced.

A direct reduction plant can, however, also generate iron briquettes wherein the hot reduced oxide materials are agglomerated by means of hot briquetting into larger units (hot briquetted iron (HBI) or hot compacted iron (HCI)). Low reduced iron (LRI) can also be drawn from the reduction shaft during the corresponding process control.

One embodiment of the invention provides that the first sub-stream contains exclusively top gas from a reducing reactor of a direct reduction plant. Since the top gas is very nitrogen-rich, in the event of $CO_2$ capture, the nitrogen can also be removed well by means of pressure adsorption in order to obtain a particularly nitrogen-depleted product gas.

The steam for converting CO into $CO_2$ can be produced very economically with waste heat from the plant for pig iron production, for example, with waste heat from a top gas, an off-gas, from the generator gas, from the flue gas from a reducing gas furnace or from a feedstock drying system. The waste heat may also come from steel production, specifically from the converter or an electric arc furnace. Furthermore, steam could be used from a power station in which the export gas is burned and is used for steam and electric power generation.

A portion of the water vapor for the conversion of CO into $CO_2$ can also be generated with the aid of a saturator.

The system for carrying out the method according to the invention comprises at least
- a plant for pig iron production,
- at least one conversion reactor for converting CO into $CO_2$,
- a first gas line with which waste gas from the plant for pig iron production can be fed into the conversion reactor,
- a first $CO_2$ capture system connected downstream of the conversion reactor.

Said system is characterized in that a second gas line for waste gas is provided which opens into a second $CO_2$ capture system independent of the first, without the waste gas first passing through a conversion reactor. The second gas line can therefore, for example, branch off from the first line before said first line reaches the conversion reactor. Or a common gas line for the waste gas can split into a first and a second gas line.

The system according to the invention is further characterized in that a line for product gas from a $CO_2$ capture system opens into a line for product gas from the other $CO_2$ capture system in order to mix the two product gases together so that part of the product gas following the $CO_2$ capture in the second sub-stream is mixed with the product gas following the $CO_2$ capture in the first sub-stream and the product gas can subsequently be fed as the reducing gas to the reduction shaft of the direct reduction plant.

It is furthermore provided according to the invention that a line for product gas from the second $CO_2$ capture system opens into a direct reduction plant such that the product gas can be used there for carburization and regulation of the carbon content. However, it is not precluded that the mixed product gas from the two $CO_2$ capture systems is also used in this way.

According to the invention, a line for product gas from the second $CO_2$ capture system opens into a reducing reactor of a direct reduction plant such that the product gas can be introduced into the cooling gas circuit or above the cooling zone, preferably into the transition zone, of the reducing reactor. This embodiment can also be used for mixed product gas.

The line for tail gas from the second $CO_2$ capture system can open into a reducing gas furnace of a direct reduction plant and the gas can be used there as combustion gas.

In order to mix the two tail gas streams, it can be provided that a line for tail gas from a $CO_2$ capture system opens into a line for tail gas from the other $CO_2$ capture system.

An embodiment disclosed above in relation to the method is based on the first gas line being connected to a direct reduction plant such that the first gas line can be supplied exclusively with top gas from a reducing reactor of a direct reduction plant.

In the case of the use of waste gases from pig iron production, it is provided that the first and/or second gas line are connected to plants for pig iron production such that the gas lines can contain at least one of the following gases:
- top gas from a blast furnace, in particular from an oxygen blast furnace with top gas recycling or from a reduction shaft of a smelting-reduction plant,
- waste gas from a melter gasifier of a smelting-reduction plant,
- waste gas from at least one fluidized reactor,
- waste gas from at least one packed bed reactor for preheating and/or reducing iron oxides and/or iron briquettes of a smelting-reduction plant (as provided in the FINEX® process),
- possibly waste gas from a $CO_2$ capture system, preferably a PSA system which is to be considered part of the plant for pig iron production (oxygen blast furnace, FINEX®, COREX®),
- waste gas from at least one reducing reactor of a direct reduction plant.

In order to supply the conversion reactor with steam, it can be provided that a steam line from a waste heat steam generator of the plant for pig iron production opens into the line before or directly into the conversion reactor or that a saturator which cools the waste gas is arranged before the conversion reactor.

Aside from the known advantages of converting CO into $CO_2$, such as that
- the reducing reactors (blast furnace, fluidized reactors, reduction shafts) can be dimensioned smaller because the reducing gas is better utilized due to the high hydrogen content and has a lower density, increasing the yield of a (V)PSA system by 5%-10% ($H_2$+ CO) or achieving the same yield as can be achieved with a VPSA system when a PSA system is used with a conversion reactor, in which case the vacuum pumps can be dispensed with, a reduction in the risk of "metal dusting" corrosion due to the greater $H_2$/CO ratio is enabled, the following advantages can be achieved with the method and the device according to the invention:

a higher level of metallization and/or carbon content is possible in the direct reduction reactor, due to the addition of product gas to the cooling zone of the direct reduction reactor. A higher reducing gas temperature is possible with the same content of oxidants in the reducing gas, the $H_2$/CO ratio of the product gas used as the reducing gas can be set, capture of a large part of the nitrogen with (V)PSA is possible through selective operation of the (V)PSA following CO conversion if the recycled gas from the direct reduction is converted, the temperature in the reduction zone can be set as a result of setting the $H_2$/CO ratio and thus by setting the ratio of the overwhelmingly endothermic $H_2$ reduction reactions to the overwhelmingly exothermic CO reduction reactions.

BRIEF DESCRIPTION OF THE DRAWINGS

The invention will now be described in greater detail by reference to exemplary embodiments and the drawings, in which.

MODES FOR CARRYING OUT THE INVENTION

Figure 1:
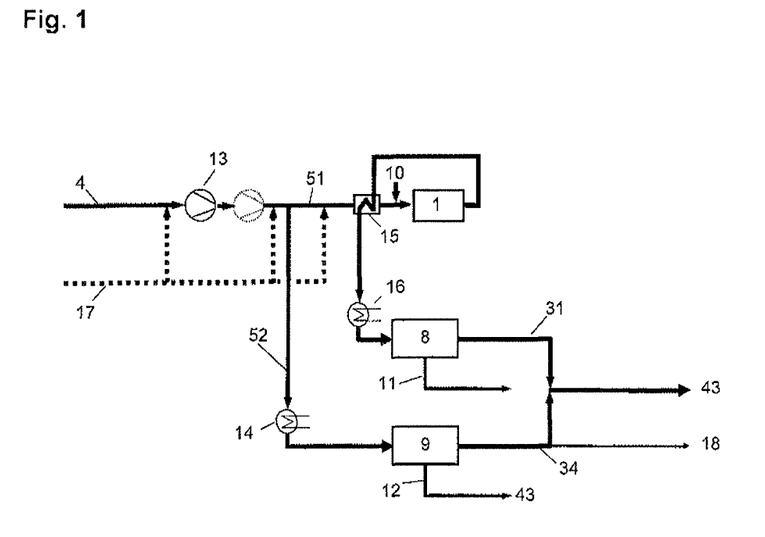
FIG. 1 is a diagram of a first embodiment according to the invention of a conversion reactor with two $CO_2$ capture systems.

FIG. 1 shows a conversion reactor 1 having two $CO_2$ capture systems 8, 9 in a first embodiment. Export gas 4 in the form of waste gas from the pig iron production is compressed with an export gas compressor 13 in one or—shown dashed—a plurality of stages. After the export gas compressor 13, a first sub-stream 51 is fed through a heat exchanger 15 to heat said sub-stream 51 and is fed to the conversion reactor 1 following the addition of low-pressure steam 10 shortly before or in the conversion reactor 1. The export gas which is thus modified and heated by the chemical reaction is fed again as a heat transport medium through the heat exchanger 15 and is cooled with fresh export gas from the first sub-stream 51. Further cooling takes place in a cooler 16 before the gas reaches the first $CO_2$ capture system 8.

A second sub-stream 52 is diverted from the export gas 4 after the export gas compressor 13, but before the heat exchanger 15 and is fed to the second $CO_2$ capture system 9 only via a cooler 14, and in no event via a conversion reactor.

The product gas 34 of this second $CO_2$ capture system 9 can be fed in whole or in part to the cooling zone of a reduction shaft 18 of a direct reduction plant 33 or mixed in whole or in part with the product gas 31 and fed to the reducing gas furnace 43 as fuel. The tail gas 12 passes as fuel gas into the reducing gas furnace 43 of the direct reduction plant 33 (see FIG. 3).

The product gas 31 from the first $CO_2$ capture system 8 is fed entirely as the reducing gas to the reducing gas furnace 43 for heating said furnace. The tail gas 11 from the first $CO_2$ capture system 8 is mixed entirely with the remaining export gas in the export gas container 5 and is no longer recycled into the direct reduction plant 33 or the plant for pig iron production, but is typically used for raw material drying in the metal works.

The individual process gases following a COREX® plant and two systems for pressure swing adsorption (PSA) have approximately the following properties:

| Gas: | Temp (° C.) | $H_2$ (vol %) | CO (vol %) | $CO_2$ (vol %) |
|---|---|---|---|---|
| Sub-stream 51 before heat exchanger 15 | 100-200 | 30 | 36 | 23 |
| Product gas 31 | 40 | 81 | 5 | 3 |
| Tail gas 11 | 40 | 12 | 2 | 82 |
| Product gas 34 | 40 | 42 | 45 | 1 |
| Tail gas 12 | 40 | 10 | 21 | 59 |

The desired CO content can now be set by mixing the two product gases 31, 34 for subsequent use of the product gases as the reducing gas. For a reduction shaft 18 of a direct reduction plant 33, the ratio $H_2$/CO should lie in the range of 1.5 to 4.5 because a productivity optimum can be achieved in this range. However, the pressure loss via the reduction shaft or another reduction unit must also be taken into account. If the ratio $H_2$/CO is too low, then on account of the excessively high pressure loss via the reduction shaft 18, in accordance with FIG. 3, a smaller system output results from the hydraulic limitation. If the ratio $H_2$/CO is too high, then the charge cools too much in the reduction shaft due to the overwhelmingly endothermic reactions.

Gas known as "return gas" 17 can be mixed into the export gas 4
  directly before the export gas compressor 13,
  directly following said compressor but before the division of the export gas into two sub-streams 51, 52 and/or
  after the branching of the second sub-stream 52 to the second $CO_2$ capture system 9, but before the heat exchanger 15. Return gas 17 is purified top gas 46 from a reduction shaft 18 of a direct reduction plant 33 which is fed back partially as combustion gas for the reducing gas furnace 43 of the direct reduction plant 33 (see FIG. 3).

Figure 2:
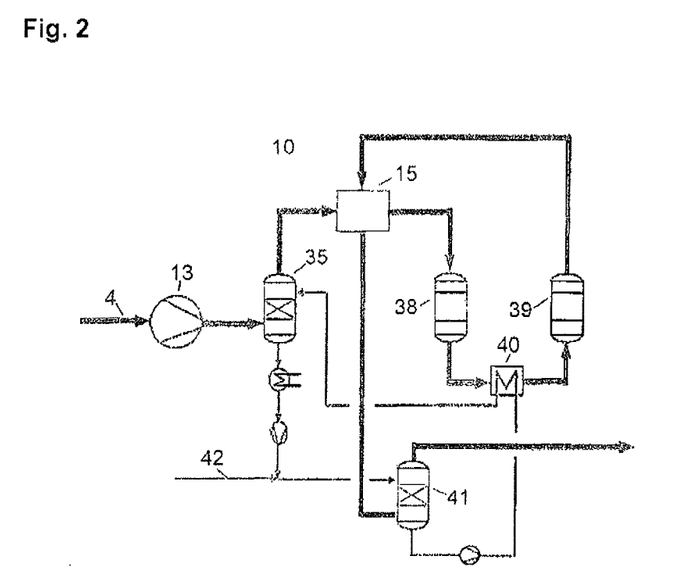
FIG. 2 is a diagram of an arrangement for a conversion reactor and a saturator.

FIG. 2 shows the portion of the plant around the conversion reactor 1 of FIG. 1 in greater detail, although the diversion of the second sub-stream 52 and the addition of return gas 17 are not shown. The export gas 4 is compressed in the export gas compressor 13 and has a temperature in the range of 100° C. to 200° C. The gas passes to a saturator 35 where warmed water is added to the export gas 4. Due to the heat contained in the export gas 4, the water is evaporated, as a result of which the addition of further steam can be reduced.

In the pipeline from the saturator 35 to the heat exchanger 15, further low pressure steam 10 is added before the export gas 4 is heated in the heat exchanger 15 to a temperature in the range of approximately 300° C. to 450° C. The conversion reactor 1 of FIG. 1 can be configured with multiple steps and here has, for example, a first conversion unit 38 and a second conversion unit 39 between which a gas cooler 40 is arranged. During the water gas shift reaction, the gas temperature rises by a value in the range of 100° C. to 150° C. Alternatively, the conversion reactor 1 or 38, 39 can also be operated isothermically with the simultaneous production of steam. The converted export gas is cooled in the heat exchanger 15 and can be fed, in a further gas cooler 41, to the added water 42 and/or the water from the saturator 35, and further cooled if required for the subsequent first $CO_2$ capture system 8. In the gas cooler 41, the steam contained in the converted export gas can also be substantially reduced.

In the $CO_2$ capture systems 8, 9, the $CO_2$ content is reduced to a value in the range of 0.3% to 10% by volume.

Figure 3:
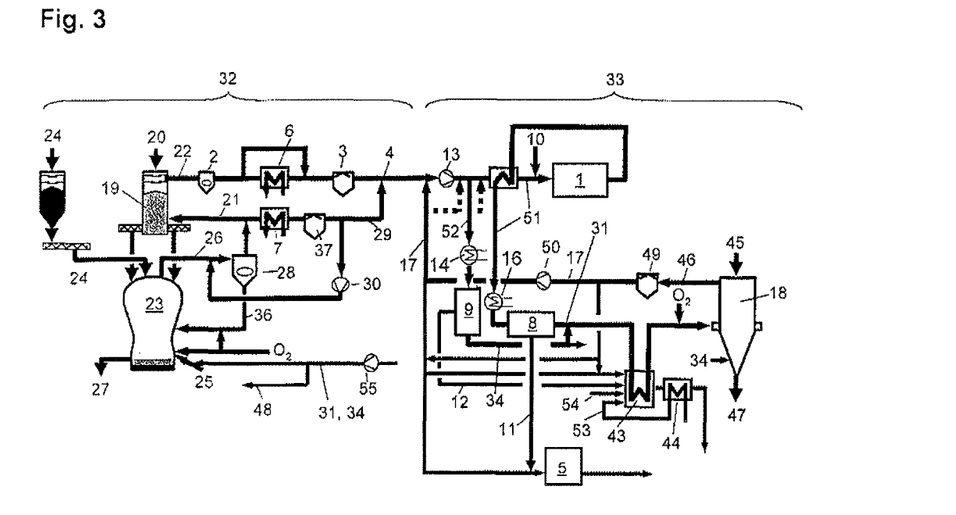
FIG. 3 is a diagram of a plant according to the invention as per the first embodiment comprising a COREX® plant and a direct reduction plant.

FIG. 3 shows the connection according to the invention between a plant for smelting-reduction (COREX® plant 32) on one side and a direct reduction plant 33 on the other side.

In this example, the COREX® plant 32 has a reduction shaft 19 which is configured as a packed bed reactor and is fed with lump ore, pellets, sinter and additives (see reference sign 20). The reducing gas 21 is fed in counterflow to the lump ore etc. 20. Said reducing gas is introduced into the lower part of the reduction shaft 19 and emerges from the upper side as top gas 22. The heat of the top gas 22 from the reduction shaft 19 can be used in a heat recovery steam generator 6 for steam generation and the low pressure steam thereby generated can be fed to the conversion reactor 1 (see reference sign 10). A bypass line round the heat recovery steam generator 6 is provided, so that the top gas 22 can be conducted round the heat recovery steam generator 6 without enforced cooling. Before entry into the heat recovery steam generator 6, the top gas 22 can be freed from dust in a dust separator or cyclone 2 which has the form, for example, of a hot gas cyclone. The waste gas emerging from the heat recovery steam generator 6 is further cleaned and cooled in a wet washing system 3 and is fed, according to the invention as described above, as export gas 4 to the conversion reactor 1 for conversion of CO into $CO_2$.

The reducing gas 21 for the reduction shaft 19 is produced in a melter gasifier 23 into which both coal in the form of lump coal or coke 24 and possibly coal in powder form 25—together with oxygen $O_2$—and into which also the iron ore pre-reduced in the reduction shaft 19 is fed. The coal in the melter gasifier 23 is gasified, so that a gas mixture is formed, consisting mainly of CO and $H_2$ and is drawn off as top gas (generator gas) 26 and a sub-stream thereof is fed as reducing gas 21 to the reduction shaft 19. The hot metal melted in the melter gasifier 23 and the slag are drawn off (see arrow 27).

The generator gas 26 drawn off from the melter gasifier 23 is fed, after cooling, into a separator 28 (hot gas cyclone) to remove discharged dust and to feed the dust 36 back via dust burners into the melter gasifier 23.

Part of the generator gas 26 cleaned of coarse dust is further cleaned with a wet washer 37 and is removed from the COREX® plant 32 as excess gas 29 and mixed with the export gas 4. A further heat recovery steam generator 7 can be arranged before the wet washer 37 and/or in the pipeline for generator gas 26 (not shown), the low pressure steam from said steam generator being fed to the conversion reactor 1.

Part of the cleaned generator gas 26 following the wet washer 37 is used for cooling a cooling gas compressor 30 and can again be fed to the generator gas 26 for cooling following the melter gasifier 23. By means of this recycling, the reducing content contained therein can still be used for the COREX® process whilst the required cooling of the hot top gas or generator gas 26 from approximately 1050° C. to in the range of 700° C.-900° C. can be ensured.

In this exemplary embodiment, low pressure steam 10 from the heat recovery steam generators 6, 7 of the COREX® plant 32 can be fed into the conversion reactor 1. Preferably, the waste heat from the iron making process or the direct reduction process is to be utilized due to the short routes between the heat recovery steam generators 6, 7 and the conversion reactor 1.

The cleaned top gas 22 and part of the excess gas 29 are drawn off as export gas 4 from the COREX® plant 32 and are compressed before the conversion reactor 1 by means of an export gas compressor 13.

If, in place of the COREX® plant 32, an oxygen blast furnace with top gas recycling is used, then the top gas or blast furnace gas is drawn off from the top of the blast furnace, part thereof is returned to the oxygen blast furnace and part of the top gas or blast furnace gas is pre-cleaned in a dust separator or cyclone and then cleaned again in a wet washer (or a bag filter or a hot gas filter system). The top gas or blast furnace gas thus cleaned is then directly removed as export gas 4 from the blast furnace system and is at least partially fed to the conversion reactor 1.

If, in place of the COREX® plant 32, a FINEX® plant is used, then following the last of the three or four fluidized reactors in which the pre-reduction of the fine ore takes place, a sub-stream of the top gas is drawn off as export gas, cleaned of dust and fed back to the conversion reactor 1. As in the COREX® plant 32, a part of the excess gas from the melter gasifier can also be added to the export gas.

The product gas 31 freed from $CO_2$ produced in the first $CO_2$ capture system 8 arranged in the sub-stream 51 and configured as a PSA system is subsequently heated in a reducing gas furnace 43 which preferably has an air pre-heater 44. The air pre-heater 44 supplies pre-heated combustion air 53. Non-pre-heated air 54 can also be fed to the reducing gas furnace 43 for combustion. The waste gas from the reducing gas furnace 43 gives up part of the energy thereof to the combustion air 53 in the air pre-heater 44 and is then conducted away to the atmosphere.

The product gas 31 is partially oxidized, possibly with oxygen $O_2$, in the reducing gas furnace 43 and is subsequently fed into the reduction shaft 18 of the direct reduction plant 33 where the lump ore and/or the pellets 45 supplied from above are fed in.

The top gas 46 is subsequently further cleaned in a wet washer 49 and compressed in a return gas compressor 50 before part thereof is mixed with the export gas 4 before the conversion reactor 1. However, part can also be fed via an export gas container 5 to the steam boiler of a steam generating system as a fuel or used for raw material drying (coal, fine coal or ore drying). A further part is diverted before the return gas compressor 50 and used as combustion gas for the reducing gas furnace 43.

The tail gas 11 from the first $CO_2$ capture system 8 is fed to the export gas compressor 13. The tail gas 12 from the second $CO_2$ capture system 9 which is preferably configured as a PSA system is fed entirely as combustion gas to the reducing gas furnace 43.

The product gas 34 from the second $CO_2$ capture system 9 can be partially fed to the cooling zone of the reduction shaft 18 of the direct reduction plant 33 and can be partially mixed with the product gas 31 of the first $CO_2$ capture system 8. The lower, narrowing part of the reduction shaft 18 is the cooling zone whilst the cylindrical upper part is the actual reduction zone. Between the cooling zone and the reduction zone lies the transition zone.

The reduction shaft 18 must not necessarily be configured as a packed bed but can alternatively be configured as a fluidized bed. At the lower end—depending on the input materials fed in and depending on the process control—either sponge iron (DRI, direct reduced iron), hot briquetted iron (HBI), hot compacted iron (HCI) or low reduced iron (LRI) is removed (see reference sign 47). In the case of a fluidized bed, briquetting of the reduced, hot oxide material is required.

Part of the product gases 31, 34 can also be fed as reducing gas to the melter gasifier 23, for which purpose, however, said gases may possibly have to be compressed in advance in a product gas compressor 55. Said gas can then be introduced together with the coal in powdered form 25, wherein the product gas serves as a conveying medium for the coal in powdered form. A further portion 48 of the product gases 31, 34 can be diverted after the product gas compressor 55 and before the melter gasifier 23 and used as a nitrogen substitute in the metal works, specifically wherever a nitrogen input into the process gases is undesirable, for example, for cooling coal charging units in the melter gasifier.

If the waste gas from a plant for pig iron production is cleaned of dust only when dry, for example, by means of ceramic filters or bag filters, the heat of the exhaust gas can be used for the water-gas shift reaction in the conversion reactor 1. In this case, the compression takes place only after the conversion reactor 1. Therefore if, in FIG. 3, the wet washer 3 and/or 37 were omitted, then the export gas compressor 13 would be arranged in the first sub-stream 51 after the conversion reactor 1 and before the first $CO_2$ capture system 8 and a further compressor would be arranged in the second sub-stream 52 before the second $CO_2$ capture system 9.

In FIG. 4, an embodiment variant is shown wherein the return gas of the reducing reactor of a direct reduction plant is fed only at least partially to the conversion reactor 1, that is, for example, part of the cleaned top gas 46 from the reduction shaft 18 of FIG. 3 as return gas 17. Waste gas (e.g. export gas 4) from a smelting-reduction plant or from a blast furnace is not conducted to the conversion reactor 1, but rather only to the second $CO_2$ capture system 9.

The return gas 17 is compressed in a return gas compressor 50 and at least partially conducted through the heat exchanger 15 in order to heat said gas. Another part is conducted past the heat exchanger 15 in order to regulate the quantity that is subjected to CO conversion (sub-stream shift). Following the addition of water and/or steam, the return gas heated in the heat exchanger 15, for example, low pressure steam 10 passes into the conversion reactor 1 and again gives up part of the heat thereof in the heat exchanger 15 to the fresh return gas 17. A further part of the heat is extracted in the cooler 16 before which the return gas which bypasses the heat exchanger 15 is also added.

The return gas 17 has a greater nitrogen content due to internal enrichment (addition of $N_2$ in the reduction unit and gas recycling) than the other process gas streams, that is, the first and second sub-streams 51, 52 of FIG. 1 or the export gas 4 from a smelting-reduction. It is known that the adsorption forces arising during pressure swing adsorption have different strengths for different gases. Said forces are therefore stronger for water than for $CO_2$, and are stronger for $CO_2$ than for CO and are stronger for CO than for nitrogen. For hydrogen they are weaker yet than for nitrogen. If the first $CO_2$ capture system 8 is configured as a (vacuum) pressure swing adsorption system and if said system is operated such that the nitrogen is also captured, then a very low-nitrogen product gas can be made without hydrogen being removed from the product gas.

The export gas 4 is compressed as in FIG. 1, but in an export gas compressor 13, cooled in a cooler 14 and then fed to the second $CO_2$ capture system 9. The use of the product gases 31, 34 and the tail gases 11, 12 is essentially the same as that in FIG. 1.

REFERENCE SIGNS

1 Conversion reactor
2 Dust separator or cyclone
3 Wet washer
4 Waste gas (export gas)
5 Export gas container
6 Waste heat recovery steam generator in the form of a heat recovery steam generator for top gas 22
7 Waste heat recovery steam generator in the form of a heat recovery steam generator (aftercooler)
8 First $CO_2$ capture system
9 Second $CO_2$ capture system
10 Low pressure steam
11 Tail gas after first $CO_2$ capture system 8
12 Tail gas after second $CO_2$ capture system 9
13 Export gas compressor
14 Cooler before second $CO_2$ capture system 9
15 Heat exchanger
16 Cooler before first $CO_2$ capture system
17 Return gas
18 Reducing reactor (reduction shaft) of the direct reduction plant 33
19 Reduction shaft of the COREX® plant 32
20 Lump ore, pellets, sinter and additives
21 Reducing gas
22 Top gas from reduction shaft 19
23 Melter gasifier
24 Lump coal or coke
25 Coal in powder form
26 Top gas or generator gas from melter gasifier 23
27 Hot metal and slag
28 Separator for fine ore
29 Excess gas
30 Cooling gas compressor
31 Gas (product gas) freed from $CO_2$, from first $CO_2$ capture system 8
32 COREX® plant
33 Direct reduction plant
34 Gas (product gas) freed from $CO_2$, from second $CO_2$ capture system 9
35 Saturator
36 Dust from separator 28
37 Wet washer for top gas 26
38 First conversion unit
39 Second conversion unit
40 Gas cooler
41 Gas cooler
42 Added water, possibly processed water
43 Reducing gas furnace
44 Air pre-heater
45 Lump ore and/or pellets
46 Top gas from reduction shaft 18
47 Hot briquettes of iron or low reduced iron
48 Product gases as nitrogen substitute
49 Wet washer for top gas 46
50 Return gas compressor
51 First sub-stream of waste gas
52 Second sub-stream of waste gas
53 Pre-heated combustion air 54 Air
55 Product gas compressor

The invention claimed is:

1. A method for treating waste gases from plants for pig iron production, comprising:
receiving waste gas of a pig iron production plant;
separating the waste gas into a first sub-stream of the waste gas and a second sub-stream of the waste gas;
adding water and/or water vapor to the first sub-stream of the waste gas;
following the addition of water and/or water vapor, subjecting the first sub-stream of the waste gas to at least partial conversion of CO into $CO_2$;
subsequently subjecting the first sub-stream of the waste gas to $CO_2$ capture in a first $CO_2$ capture system to produce a first product gas;
without subjecting the second sub-stream of the waste gas to conversion of CO into $CO_2$, subjecting the second sub-stream to $CO_2$ capture in a second $CO_2$ capture system separately from the first sub-stream to produce a second product gas;
using the first and the second product gases for carburization and for regulating the carbon content in a reducing reactor of a direct reduction plant by mixing a first part of the second product gas with the first product gas to obtain a preset ratio of hydrogen to CO, and feeding the mixed first and second product gases to the reducing reactor of the direct reduction plant; and
feeding a second part of the second product gas to the reducing reactor independently of the first part of the second product gas.

2. The method as claimed in claim 1, wherein a tail gas following the $CO_2$ capture in the second $CO_2$ capture system is used for combustion in the reducing gas furnace of the direct reduction plant.

3. The method as claimed in claim 2, further comprising mixing together a tail gas following the $CO_2$ capture in the first $CO_2$ capture system and the tail gas following the $CO_2$ capture in the second $CO_2$ capture system.

4. The method as claimed in claim 1, wherein the waste gas contains at least one of the following gases:
top gas from a blast furnace, or from a reduction shaft of a smelting-reduction plant;
waste gas from a melter gasifier of a smelting-reduction plant;
waste gas from at least one fluidized reactor;
waste gas from at least one packed bed reactor for preheating iron oxides or iron briquettes of a smelting-reduction plant;
waste gas from at least one packed bed reactor for reducing iron oxides or iron briquettes of a smelting-reduction plant;
waste gas from a $CO_2$ capture system associated with the plant for pig iron production; and
waste gas from at least one reducing reactor of a direct reduction plant.

5. The method as claimed in claim 4, wherein the blast furnace is an oxygen blast furnace with top gas recycling.

6. The method as claimed in claim 1, wherein the first sub-stream of the waste gas contains exclusively top gas from a reducing reactor of a direct reduction plant.

7. The method as claimed in claim 1, further comprising using waste heat from the plant for pig iron production for producing at least part of a steam for the conversion of CO into $CO_2$.

8. The method as claimed in claim 1, further comprising using waste heat from the waste gas for producing at least part of a steam for the conversion of CO into $CO_2$.

9. A method for treating waste gases from plants for pig iron production, comprising:
receiving waste gas of a pig iron production plant;
separating the waste gas into a first sub-stream of the waste gas and a second sub-stream of the waste gas;
adding water and/or water vapor to the first sub-stream of the waste gas;
following the addition of water and/or water vapor, subjecting the first sub-stream of the waste gas to at least partial conversion of CO into $CO_2$;
generating a product gas by subsequently subjecting at least one of the first sub-stream and the second sub-stream of the waste gas to $CO_2$ capture; and
feeding at least a part of the product gas to a reducing reactor of a direct reduction plant to regulate the carbon content in the reducing reactor.

* * * * *